US011679476B2

(12) United States Patent
Chen et al.

(10) Patent No.: US 11,679,476 B2
(45) Date of Patent: Jun. 20, 2023

(54) PULLER

(71) Applicants: Yi-Fang Chen, Taichung (TW); Wei-Li Chen, Taichung (TW)

(72) Inventors: Yi-Fang Chen, Taichung (TW); Wei-Li Chen, Taichung (TW)

( * ) Notice: Subject to any disclaimer, the term of this patent is extended or adjusted under 35 U.S.C. 154(b) by 81 days.

(21) Appl. No.: 17/213,218

(22) Filed: Mar. 26, 2021

(65) Prior Publication Data

US 2022/0152799 A1 May 19, 2022

(30) Foreign Application Priority Data

Nov. 18, 2020 (TW) ................................ 109140259

(51) Int. Cl.
*B23P 11/00* (2006.01)
*B25B 27/06* (2006.01)

(52) U.S. Cl.
CPC .......... *B25B 27/062* (2013.01); *B25B 27/064* (2013.01)

(58) Field of Classification Search
CPC ..... B25B 27/00; B25B 27/02; B25B 27/0028; B25B 27/270035; B25B 27/064; B25B 27/304; B23P 11/00; B23P 11/02; B23P 11/027; B23P 19/00; B23P 19/10
See application file for complete search history.

(56) References Cited

U.S. PATENT DOCUMENTS

| | | | | |
|---|---|---|---|---|
| 6,895,646 | B1 * | 5/2005 | Houg | B25B 27/026 29/261 |
| 2013/0152353 | A1 * | 6/2013 | Hu | B25B 27/023 29/256 |
| 2015/0246436 | A1 * | 9/2015 | Huang | B25B 27/062 29/256 |
| 2016/0151867 | A1 * | 6/2016 | Chen | B25B 27/062 29/261 |
| 2022/0152797 | A1 * | 5/2022 | Chen | B25B 27/023 |
| 2022/0152798 | A1 * | 5/2022 | Chen | B25B 27/0035 |
| 2022/0152799 | A1 * | 5/2022 | Chen | B25B 27/062 |
| 2022/0152800 | A1 * | 5/2022 | Chen | B25B 27/062 |

* cited by examiner

*Primary Examiner* — Lee D Wilson
(74) *Attorney, Agent, or Firm* — Bruce Stone LLP; Joseph A. Bruce

(57) ABSTRACT

A puller includes a collar, claws, a synchronizer and an abutting element. The collar includes slots and pivotal connectors located corresponding to the slots. The claws are pivotally connected to the pivotal connectors. Each of the claws includes a protuberance movable in and along a corresponding one of the slots. The synchronizer includes a receiving portion for receiving the protuberances. The synchronizer is movable in the collar between an opening position and a closing position. In the opening position, the synchronizer opens the claws by the protuberances. In the closing position, the synchronizer closes the claws by the protuberances. The abutting element is extensible from the collar.

14 Claims, 14 Drawing Sheets

PULLER

BACKGROUND OF INVENTION

1. Field of Invention

The present invention relates to a puller and, more particularly, to a simple, efficient, safe and easy-to-use puller.

2. Related Prior Art

Various annular elements such as bearings, gears and pulleys are used on various axles. To remove an annular element from an axle, pullers are used. A conventional puller includes two claws pivotally connected to a collar. An abutting element such as threaded rod or a hydraulic device is inserted in the collar. In use, the claws are engaged with the annular element. Then, the abutting element is operated to abut an end thereof against an end of the axle. The operation of the abutting element is continued to move the collar and the claws away from the axle. Thus, the annular element is detached from the axle. However, the claws are not interconnected so that each of the claws is engaged with or disengaged from a portion of the annular element independent of the other claw. Attention has to be paid to the engagement of each of the claws with the corresponding portion of the annular element because the former might be disengaged from the latter accidentally. Such accidental disengagement is hazardous for a user of the puller.

Referring to FIG. 1, another conventional puller includes three claws 91 pivotally connected to the collar 90 formed with a screw hole for receiving an abutting element 99. Each of the claws 91 includes a slot 92. A synchronizer 96 is formed with lugs 98 movably inserted in the slots 92. A spring 95 is compressed between the synchronizer 96 and the collar 90. In use, the synchronizer 96 is moved toward the collar 90. The synchronizer 96 opens the claws 91 as the lugs 98 move along the slots 92. The claws 91 are located around an annular element to be detached from an axle. An end of the abutting element 99 is abutted against an end of the axle. The synchronizer 96 is released so that the spring 95 moves the synchronizer 96 away from the collar 90. The synchronizer 96 closes the claws 91 as the lugs 98 move along the slots 92. Thus, the claws 91 are engaged with the annular element. The abutting element 99 is rotated relative to the collar 90 to move the collar 90 and the claws 91 away from the axle, thereby detaching the annular element from the axle. The insertion of the lugs 98 of the synchronizer 96 in the slots 92 of the claws 91 synchronizes the pivoting of the claws 91. However, the insertion of the lugs 98 of the synchronizer 96 in the slots 92 of the claws 91 limits the pivoting of the claws 91 to a small angle so that the puller is not suitable for detaching an annular element that too small or too large from an axle. In addition, it is difficult to replace the claws 91 with longer or shorter claws because the lugs 98 of the synchronizer 96 are inserted in the slots 92 of the claws 91. Hence, a user has to purchase and keep several pullers of various sizes, and this is expensive and inconvenient.

Another conventional puller includes a collar, claws pivotally connected to the collar, and an adjusting assembly for adjusting the angle of the pivoting of the claws relative to the collar. Each of the claws includes a protrusion at an upper end and a barb at a lower end. The adjusting assembly includes adjusters connected to a ring. Each of the adjusters includes two abutting portions. Each of the adjusters is located between a corresponding one of the claws and the collar. The adjusters are movable downwards relative to the collar so that the first abutting portions of the adjusters push the protrusions of the claws to enlarge the angle of the pivoting of the claws. The adjusters are movable upwards relative to the collar so that the second abutting portions of the adjusters push the protrusions of the claws to reduce the angle of the pivoting of the claws. However, each of the adjusters is located between a corresponding one of the claws and the collar, thereby limiting the range of the pivoting of the claws. The adjusters might be disengaged from the claws. To avoid such disengagement, the sizes of the elements must be increased, and this renders the puller bulky and heavy, and the operation of the puller is difficult. Each of the adjusters is connected to the ring independent of the other adjusters. Hence, it is difficult to locate the adjusters at a same level relative to the collar. Hence, the angles of the pivoting of the claws relative to the collar are different so that the barbs of the claws are located at different levels. Thus, it is difficult to effectively engage the barbs of the claws with an annular element to be detached from an axle. Such disengagement might endanger a user.

The present invention is therefore intended to obviate or at least alleviate the problems encountered in the prior art.

SUMMARY OF INVENTION

It is the primary objective of the present invention to provide a simple, effective, safe and convenient puller.

To achieve the foregoing objective, the puller includes a collar, claws, a synchronizer and an abutting element. The collar includes slots and pivotal connectors located corresponding to the slots. The claws are pivotally connected to the pivotal connectors. Each of the claws includes a protuberance movable in and along a corresponding one of the slots. The synchronizer includes a receiving portion for receiving the protuberances. The synchronizer is movable in the collar between an opening position and a closing position. In the opening position, the synchronizer opens the claws by the protuberances. In the closing position, the synchronizer closes the claws by the protuberances. The abutting element is extensible from the collar.

Other objectives, advantages and features of the present invention will be apparent from the following description referring to the attached drawings.

BRIEF DESCRIPTION OF DRAWINGS

The present invention will be described via detailed illustration of three embodiments versus the prior art referring to the drawings wherein.

DETAILED DESCRIPTION OF EMBODIMENTS

Figure 1:
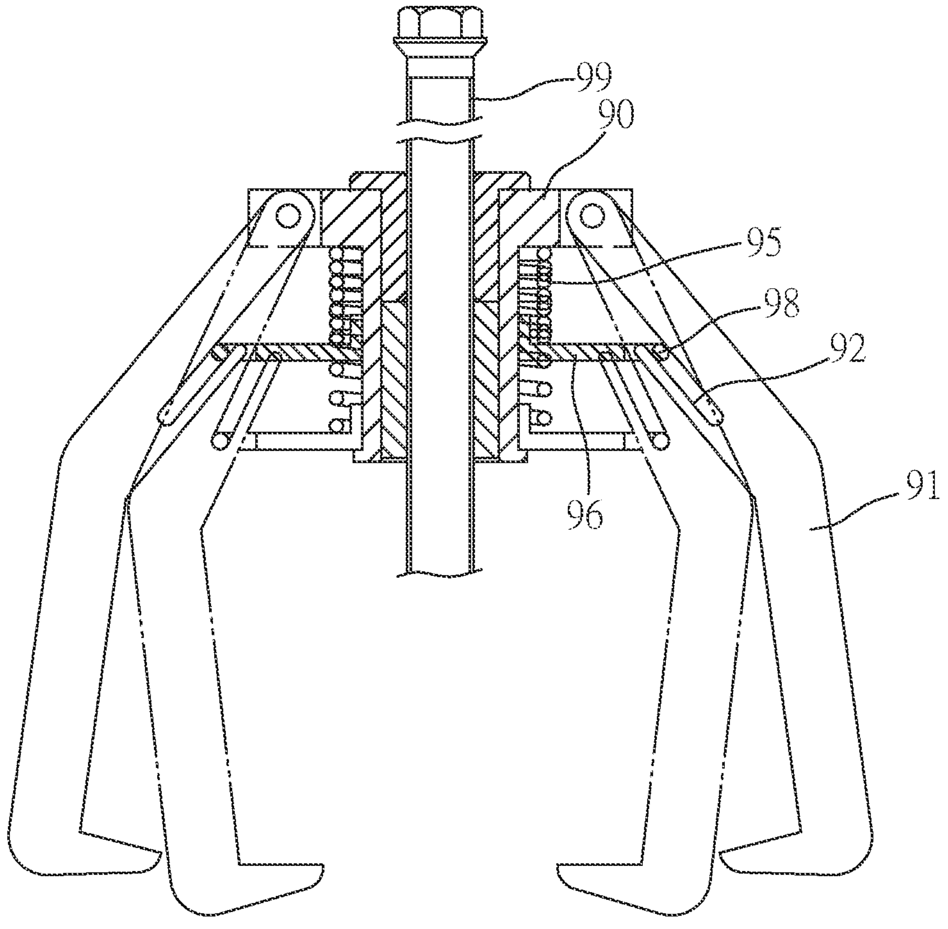
FIG. 1 is cross-sectional view of a conventional puller.
Figure 2:
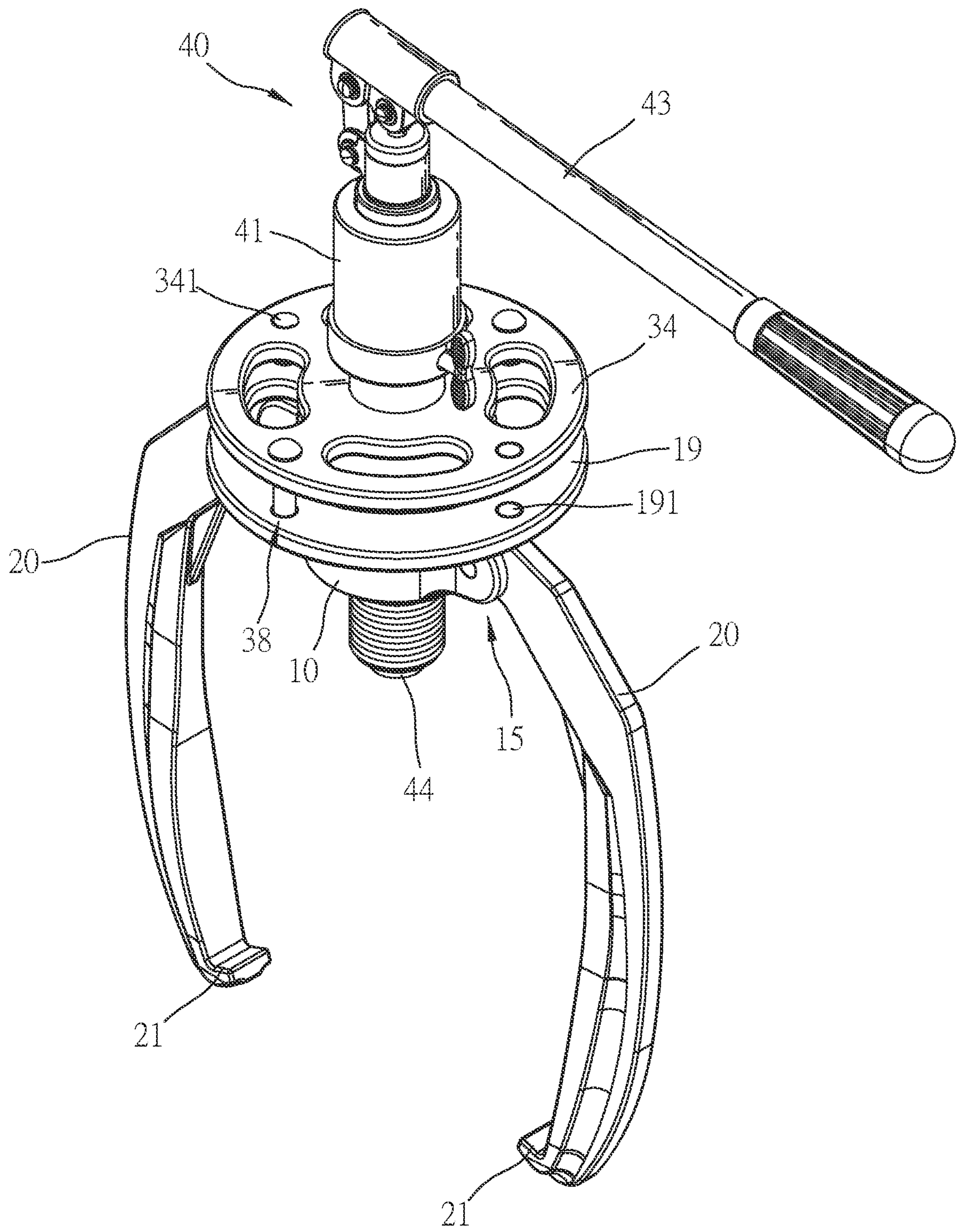
FIG. 2 is a perspective view of a puller according to the first embodiment of the present invention.
Figure 3:
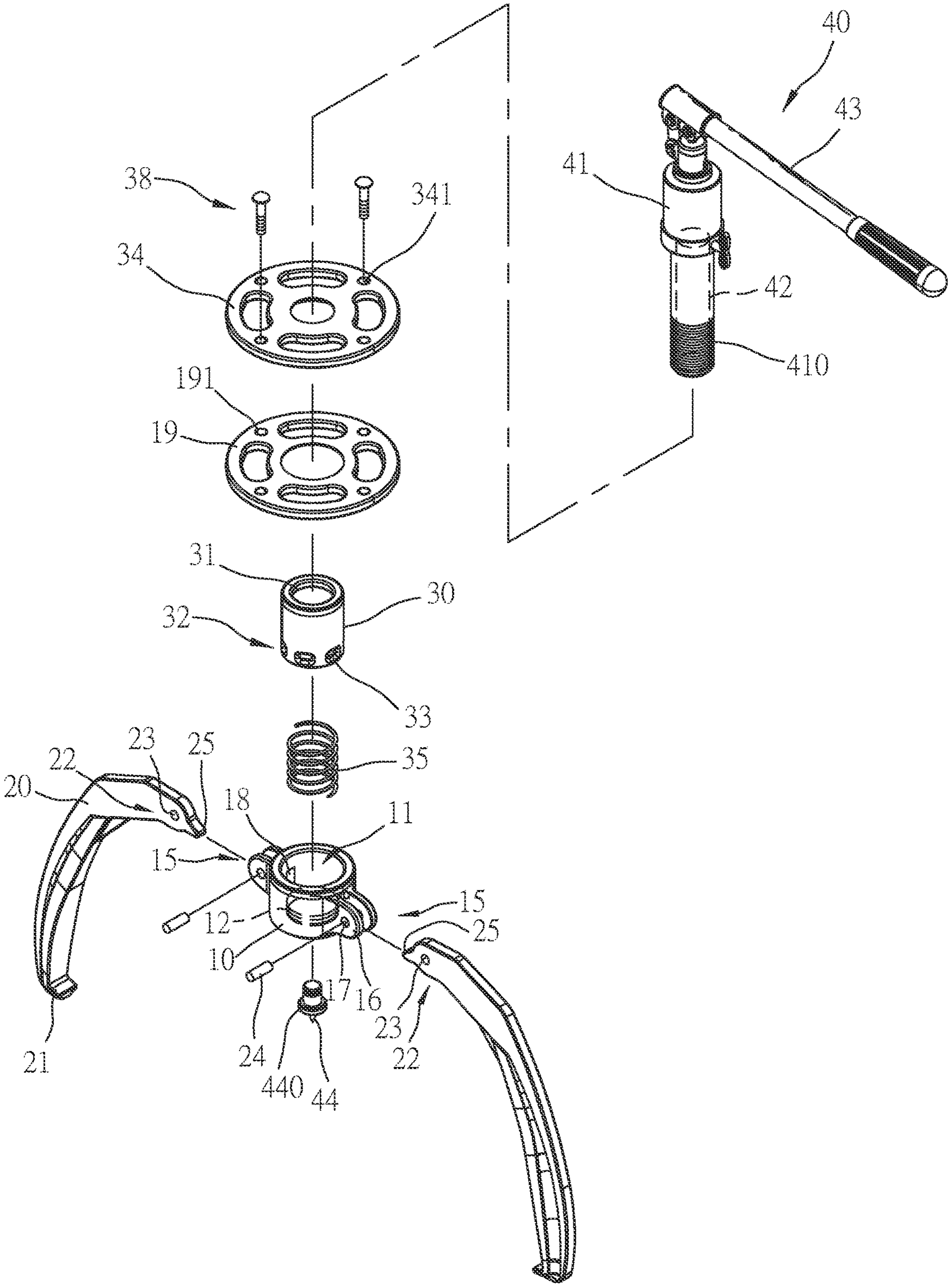
FIG. 3 is an exploded view of the puller shown in FIG. 2.
Figure 6:
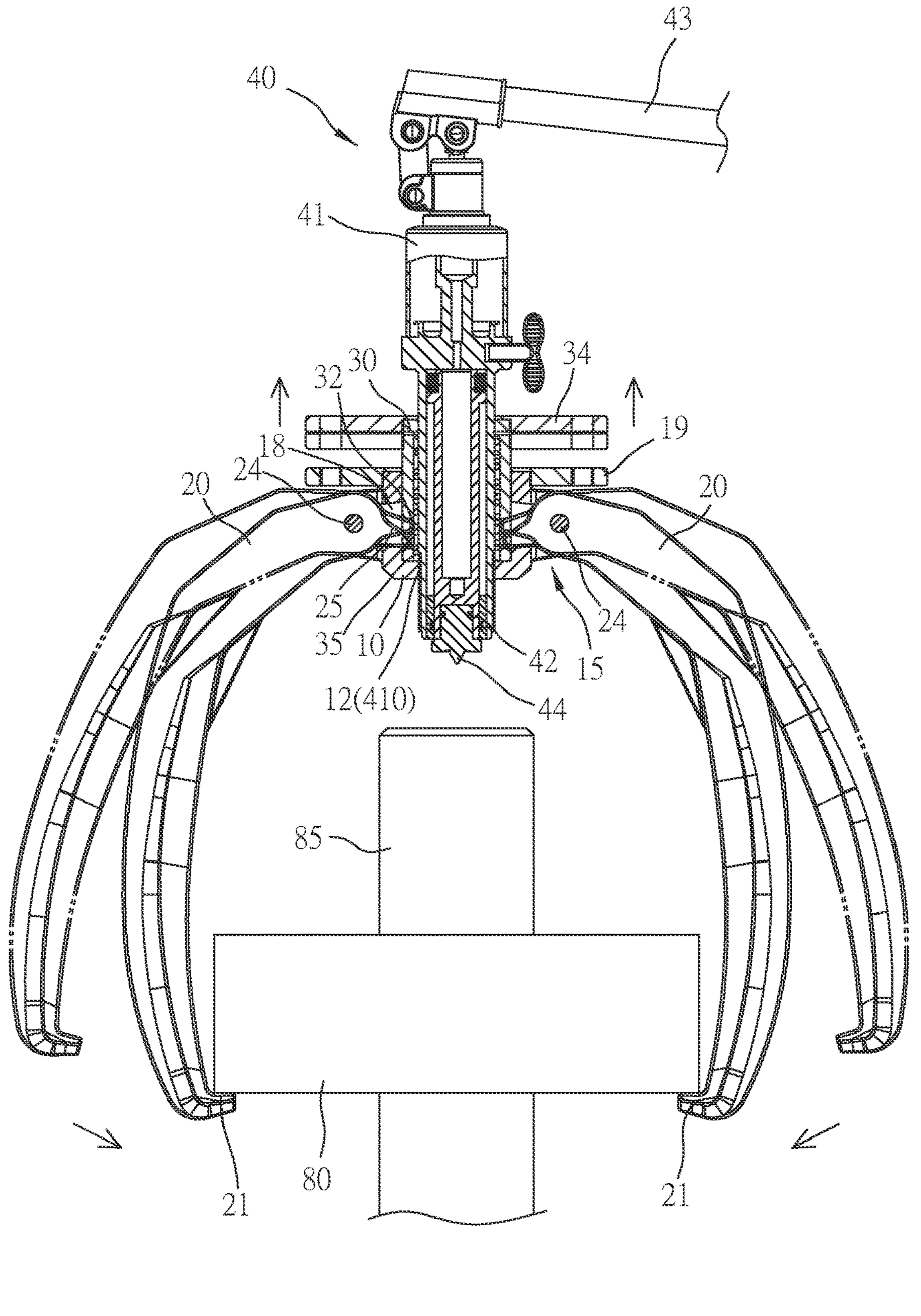
FIG. 6 is a cross-sectional view of the puller shown in FIG. 2 used to detach an annular element from an axle.
Figure 7:
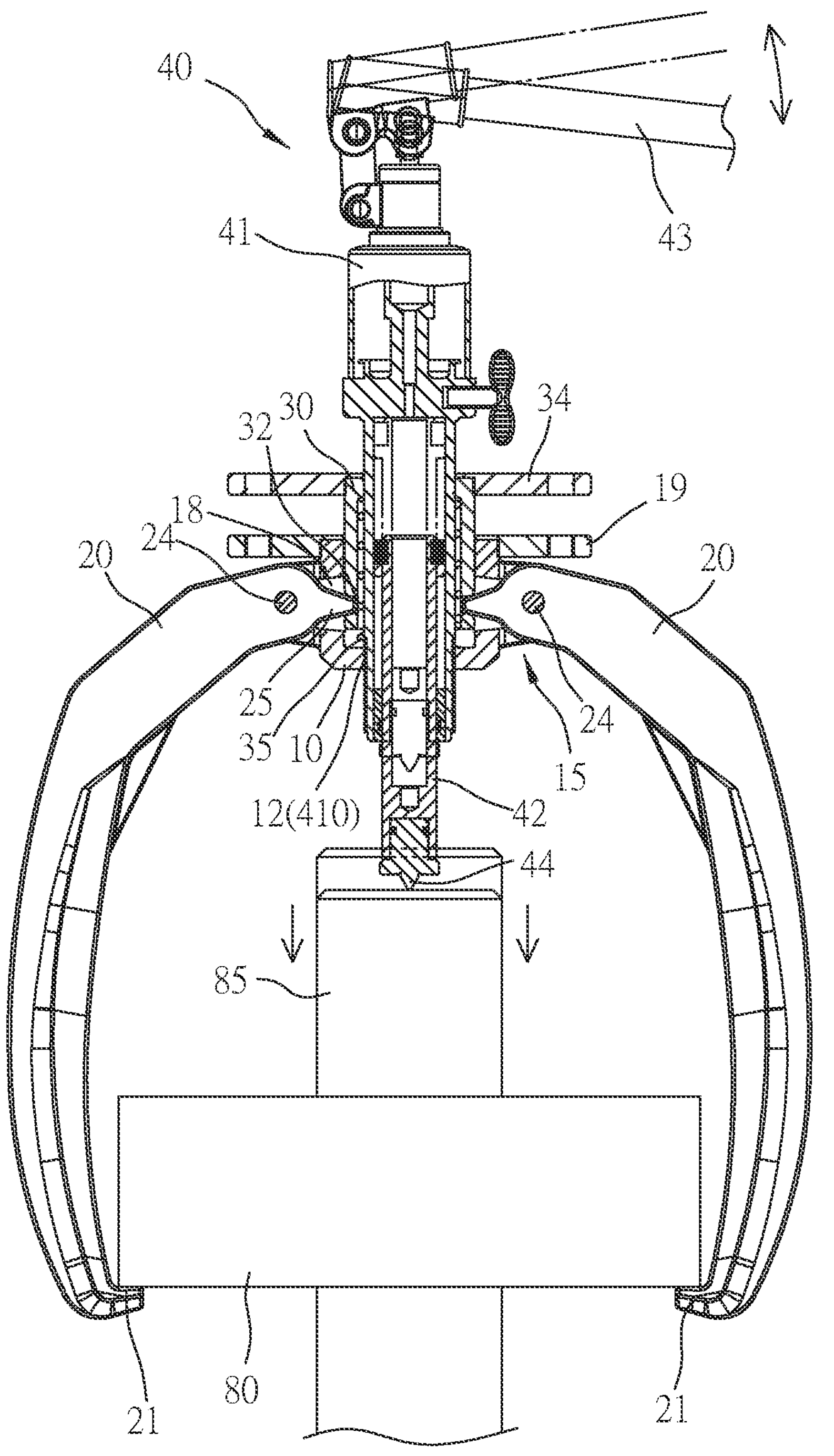
FIG. 7 is a cross-sectional view of the puller, the annular element and the axle in another position than shown in FIG. 6.

Referring to FIGS. 2 and 3, a puller includes a collar 10, two claws 20, a synchronizer 30 and an abutting element 40 in accordance with a first embodiment of the present invention. The claws 20 are pivotally connected to the collar 10. The synchronizer 30 is used to synchronize the pivoting of the claws 20 to claw an annular element 80 to be detached from an axle 85 (FIG. 6). The abutting element 40 is inserted in and connected to the collar 10. The abutting element 40 is extensible from the collar 10 to detach the annular element 80 from the axle 85 (FIG. 7).

Figure 4:
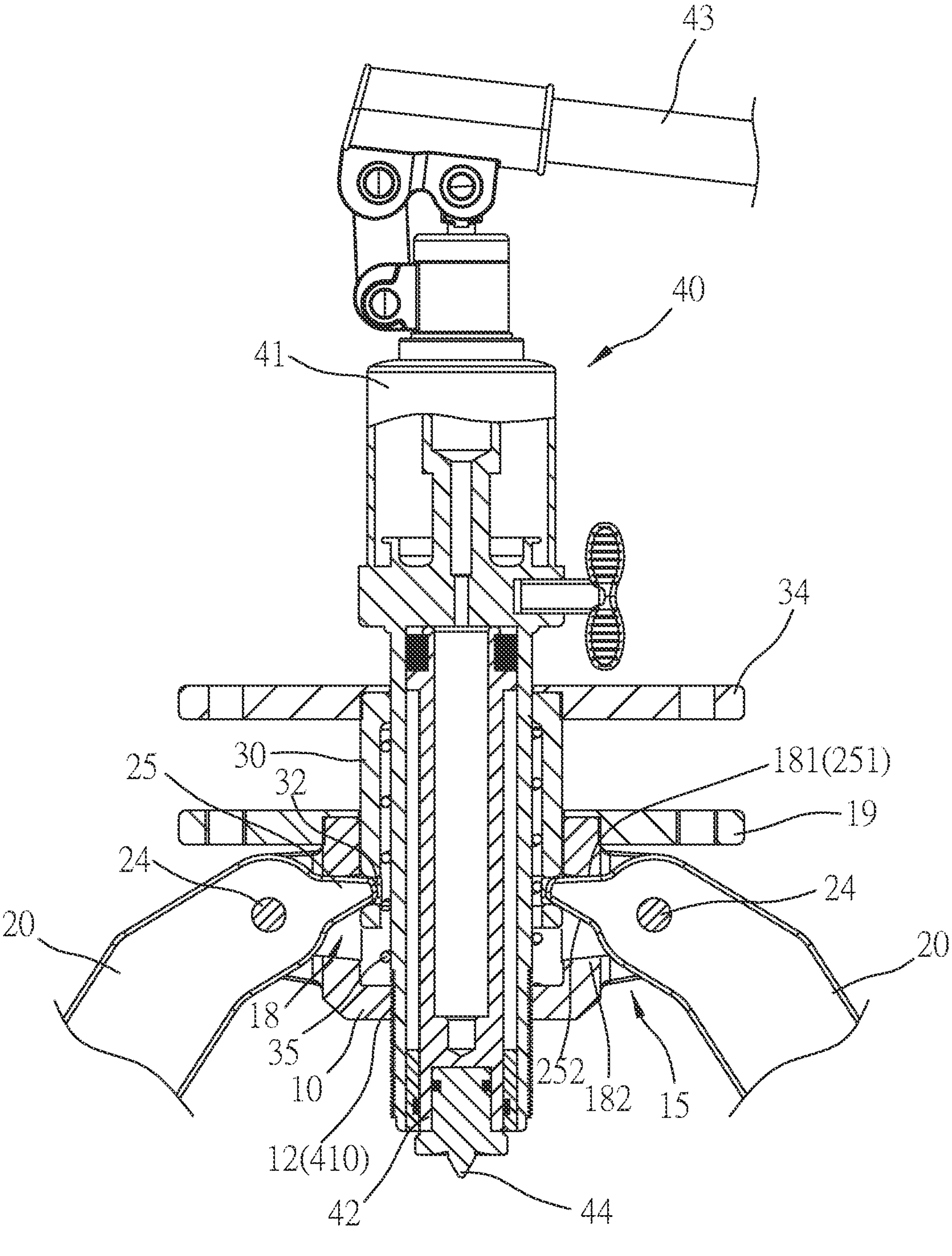
FIG. 4 is an enlarged, partial and cross-sectional view of the puller shown in FIG. 3.

Referring to FIGS. 3 and 4, the collar 10 includes a space 11, a screw hole 12 in communication with the space 11, two opposite slots 18 in communication with the space 11, and two pivotal connectors 15 located corresponding to the slots 18. The combination of the space 11 with the screw hole 12 axially extends throughout the collar 10. The abutting element 40 is inserted in the space 11. The claws 20 are connected to the pivotal connectors 15 in a manner to be described. Each of the pivotal connectors 15 includes two lugs 16 each of which includes an aperture 17. Each of the slots 18 is located between the lugs 16 of a corresponding one of the pivotal connectors 15. Each of the slots 18 includes a closing limit 181 and an opening limit 182. The limits 181 and 182 of each of the slots 18 are used to limit the range of the pivoting of a corresponding one of the claws 20.

The puller further includes two discs 19 and 34. The disc 19 includes several screw holes 191. The disc 34 includes orifices 341 corresponding to the screw holes 191.

Each of the claws 20 includes a barb 21 at a lower end, a protuberance 25 at an upper end, and a pivotally connective portion 22 in the vicinity of the barb 21. The barb 21 of each of the claws 20 is used for engagement with a portion of the annular element 80 (FIGS. 6 and 7). The pivotally connective portion 22 of each of the claws 20 is formed with an aperture 23.

In assembly, the protuberance 25 of each of the claws 20 is movably inserted in a corresponding one of the slots 18 so that the upper end of each of the claws 20 is located between the lugs 16 of a corresponding one of the pivotal connectors 15. A pivot 24 is fitted in the apertures 17 of the lugs 16 of each of the pivotal connectors 15 and the aperture 23 of a corresponding one of the claws 20. Thus, the pivotally connective portion 22 of each of the claws 20 is pivotally connected to a corresponding one of the pivotal connectors 15 of the collar 10. Each of the pivots 24 can be a pin, a rivet or a combination of a threaded bolt with a nut.

As mentioned above, the protuberances 25 of the claws 20 are movably inserted in the slots 18 of the collar 10. Thus, the protuberances 25 are moved in and along the slots 18 as the claws 20 are pivoted relative to the collar 10. Each of the protuberances 25 includes a closing limit 251 on an upper face and an opening limit 252 on a lower face. The closing limits 251 of the protuberances 25 are in contact with the closing limits 181 of the slots 18 to limit the closing of the claws 20. The closing limits 252 of the protuberances 25 are in contact with the opening limit 182 of the slots 18 to limit the opening of the claws 20. The limits 181 and 182 of each of the slots 18 extend away from each other as they extend to an internal face of the collar 10 from an external face of the collar to enlarge the angle of the pivoting of a corresponding one of the claws 20.

The synchronizer 30 is preferably a collar formed with an internal flange 31 at an upper end and a receiving portion 32 at a lower end. The receiving portion 32 of the synchronizer 30 includes several bores 33. The bores 33 can be made in an external face of the synchronizer 30 only or throughout the synchronizer 30 in a radial direction.

In assembly, the synchronizer 30 is movably inserted in the space 11 of the collar 10. A spring 35 is compressed between the synchronizer 30 and the collar 10 so that the spring 35 tends move the synchronizer 30 away from the collar 10. The spring 35 includes an end in contact with the internal flange 31 of the synchronizer 30 and an internal flange of the collar 10 formed around the space 10. The spring 35 is hidden in the synchronizer 30 in consideration of aesthetics of the puller and safety of a user.

The protuberance 25 of each of the claws 20 is inserted in a corresponding one of the bores 33 of the synchronizer 30. Thus, the synchronizer 30 is moved relative to the collar 10 to synchronously pivot the claws 20 relative to the collar 10. To keep the protuberances 25 in the corresponding one of the bores 33, the protuberances 25 are made with an adequate length and strength.

The disc 19 is attached to the collar 10 so that they are not movable relative to each other. To this end, the disc 19 is formed with a cavity (not numbered) in which an upper end of the collar 10 is fitted.

The disc 34 is attached to the synchronizer 30 so that they are not movable relative to each other. To this end, the disc 34 is formed with a cavity (not numbered) in which the upper end of the synchronizer 30 is fitted.

A screw 38 is inserted in each of the screw holes 191 of the disc 19 through a corresponding one of the orifices 341 of the disc 34. Thus, the discs 19 and 34 are movably connected to each other.

The screw holes 191 can be replaced with orifices like the orifices 341 in an alternative embodiment. A nut (not shown) is used with each of the screws 38 in such an alternative embodiment.

The abutting element 40 is preferably a hydraulic or pneumatic device including a cylinder 41 such as one made by SKF company, a piston rod 42 movably inserted in the cylinder 41, and a lever 43 operable to increase hydraulic or pneumatic pressure in the cylinder 41 to extend the piston rod 42 from the cylinder 41. The cylinder 41 is formed with a threaded section 410 inserted in the screw hole 12, thereby connecting the cylinder 41 to the collar 10 while allowing changing the elevation of the cylinder 41 relative to the collar 10. The lever 43 can be replaced with a manual pump, an electric pump or a pneumatic pump. Preferably, an end element 440 made of a harder material than the piston rod 42 is used. The end element 440 is attached to the piston rod 42. The end element 440 is formed with an insert 441 at an end and a tip 44 at an opposite end. The insert 441 of the end element 440 is inserted in a cavity of the piston rod 42. The tip 44 of the end element 440 is used for abutment against an end of the axle 85. However, the end element 440 can be made in one piece with the piston rod 42 in another embodiment.

Referring to FIG. 4, the spring 35 keeps the synchronizer 30 in an upper position relative to the collar 10. The synchronizer 30 retains the protuberances 25 of the claws 20 in an upper position relative to the collar 10 so that the claws 20 are pivoted toward the abutting element 40 about the pivots 24, i.e., closed. The closing limit 251 of the protuberance 25 of each of the claws 20 is in contact with the closing limit 181 of each of the slots 18 of the collar 10 so that the angle between each of the claws 20 and the abutting element 40 is at a smallest value. Moreover, the protuberances 25 keeps a lower section of the synchronizer 30 in the collar 10, thereby keeping the spring 35 in position.

Figure 5:
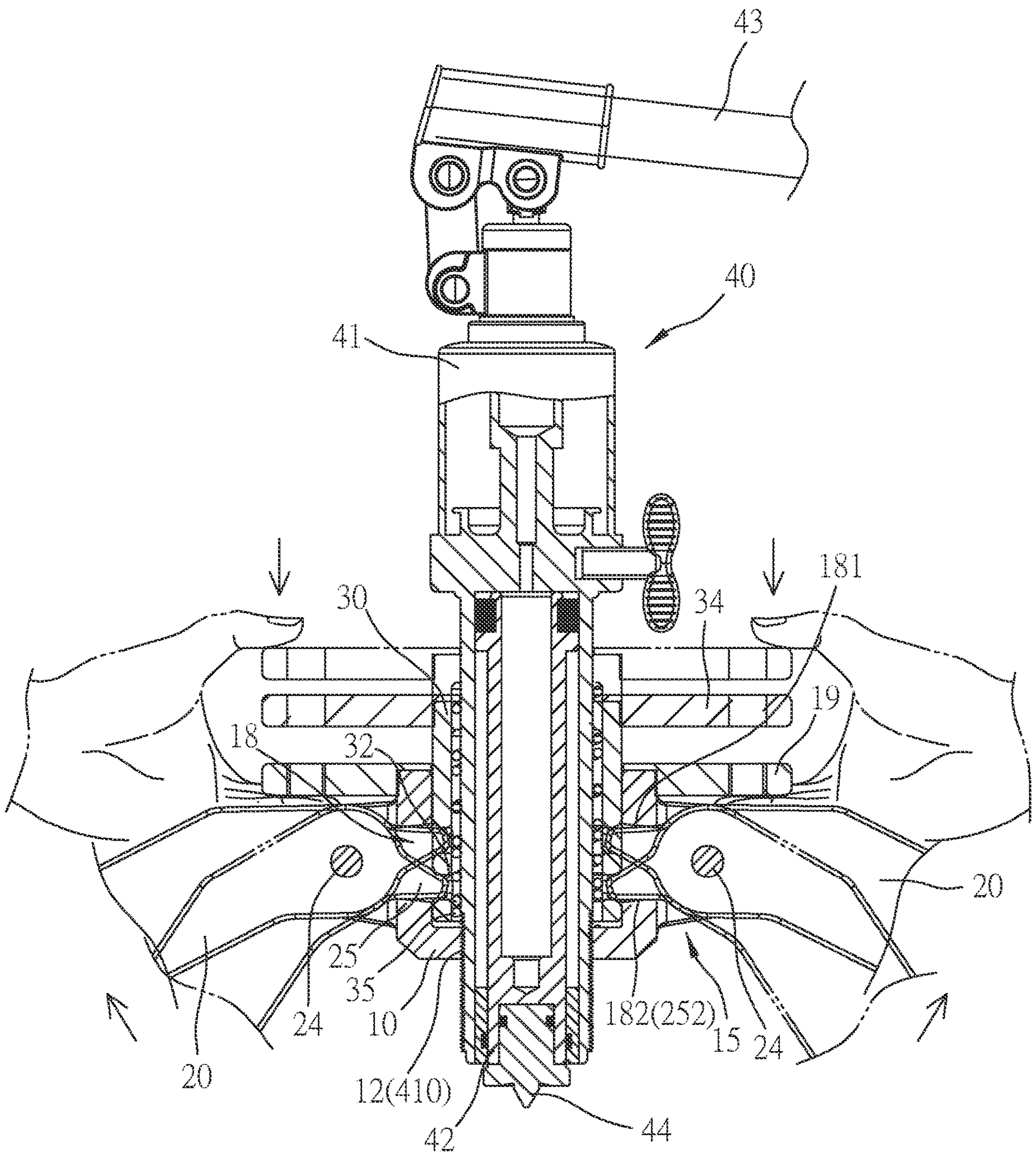
FIG. 5 is an enlarged, partial and cross-sectional view of the puller in another position than shown in FIG. 2.

Referring to FIG. 5, to detach the annular element 80 from the axle 85, the user presses the disc 34 toward the disc 19, thereby moving the synchronizer 30 toward the collar 10. Thus, the protuberances 25 of the claws 20 are moved toward the opening limits 182 of the slots 18 of the collar 10, thereby pivoting the claws 25 away from the abutting element 40, i.e., opened. The spring 35 is compressed as the synchronizer 30 is moved toward the collar 10.

Referring to FIG. 6, the claws 20 are located around the annular element 85. Then, the discs 19 and 34 are released to allow the spring 35 to move the synchronizer 30 away from the collar 10. Thus, the protuberances 25 of the claws 20 are moved toward the closing limits 181 of the slots 18 of the collar 10. Hence, the claws 20 are pivoted toward the abutting element 40, i.e., closed, to engage the barbs 21 of the claws 20 with lower portions of the annular element 80. Now, the tip 44 of the end element 440, which is attached to the piston rod 42, is located above an upper end of the axle 85.

Referring to FIG. 7, the lever 43 is operated to extend the piston rod 42 from the cylinder 41 and hence lower the piston rod 42 relative to the collar 10, thereby moving the end element 440, which is attached to the piston rod 42, toward the axle 85 so that the tip 44 of the end element 440, which is attached to the piston rod 42, is abutted against the upper end of the axle 85. The extension of the piston rod 42 from the cylinder 41 is continued to move the collar 10 and the claws 20 away from the axle 85. The claws 20 move the annular element 80 upwards relative to the axle 85 because the barbs 21 of the claws 20 are engaged with the lower portions of the annular element 80. Eventually, the annular element 80 is detached from the axle 85.

In another embodiment, the screw hole 12 of the collar 10 is replaced with an aperture, and the internal flange 31 of the synchronizer 30 is formed with a screw hole for receiving the abutting element 40. Thus, the rotation of the abutting element 40 relative to the synchronizer 30 in a sense of direction causes upward movement of the synchronizer 30 and the claws 20 relative to the abutting element 40.

Figure 8:
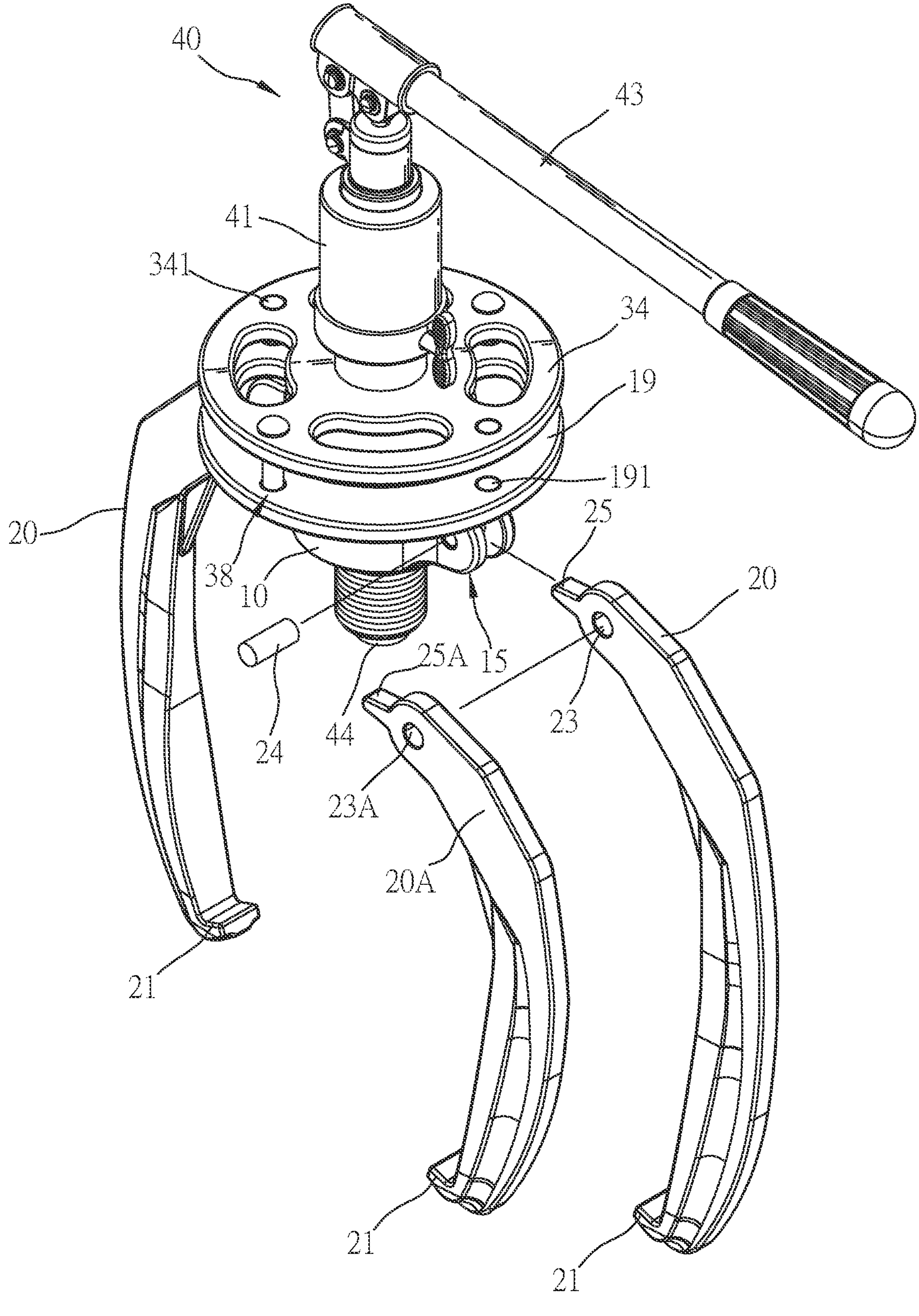
FIG. 8 is a perspective view of the puller shown in FIG. 2, with a claw to be replaced with another claw.

Referring to FIG. 8, each of the claws 20 can be replaced with a claw 20A of another size. The claw 20A is otherwise identical to the claws 20. To this end, each of the pivots 24 is detached from a corresponding one of the pivotal connectors 15 and the pivotally connective portions 22 of a corresponding one of the claws 20 to allow a corresponding one of the claws 20 to be detached from a corresponding one of the pivotal connectors 15 of the collar 10. Then, the claws 20A are connected to the pivotal connectors 15 of the collar 10 by the pivots 24.

During the replacement of the claws 20 with the claws 20A, the screws 38 avoid detachment of the discs 19 and 34 from each other. The disc 34 presses the upper end of the synchronizer 30 to keep the lower end of the synchronizer 30 in the collar 10, thereby keeping the spring 35 in position (FIG. 4). Moreover, each of the slots 18 is kept in communication with a corresponding one of the bores 33 to facilitate the insertion of the protuberance 25 of a corresponding one of the claws 20A (or the claws 20) into each of the slots 18 via a corresponding one of the bores 33.

Figure 9:
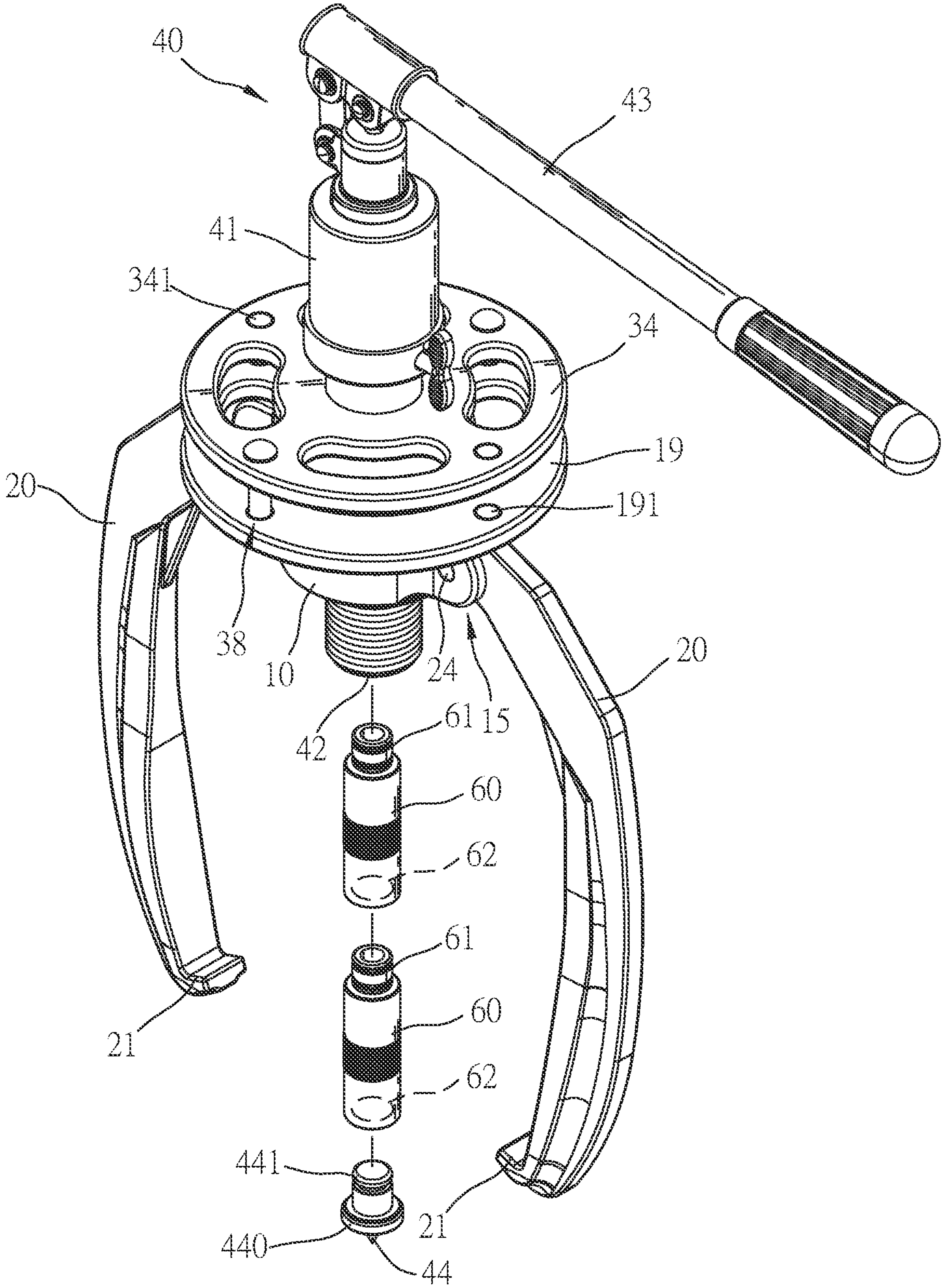
FIG. 9 is a perspective view of the puller shown in FIG. 2, used with two extensive elements.

Referring to FIG. 9, the abutting element 40 is used with two extensive elements 60 for example when the abutting element 40 is not long enough to detach the annular element 80 from the axle 85. Each of the extensive elements 60 includes an insert 61 at an upper end and a cavity 62 in each end. The insert 61 of an upper one of the extensive elements 60 is inserted in the cavity of the piston rod 42. The cavity 62 of the upper extensive element 62 receives the insert 61 of a lower one of the extensive elements 62. The insert of the end element 440 is inserted in the cavity 62 of the lower extensive element 60. The tip 44 of the end element 440 is used to abut against the upper end of the axle 85 in operation.

Preferably, the insert 61 of each of the extensive elements 60 is formed with an annular groove (not numbered) for receiving an elastic ring (not shown) or a bore (not shown) for receiving a spring-biased ball (not shown). The elastic ring or spring-biased ball is used to keep the insert 61 in the corresponding cavity.

Similarly, the insert 441 of the end element 440 is formed with an annular groove (not numbered) for receiving an elastic ring (not shown) or a bore (not shown) for receiving a spring-biased ball (not shown) to keep the insert 441 of the end element 440 in the cavity 62 of the lower extensive element 60.

Figure 10:
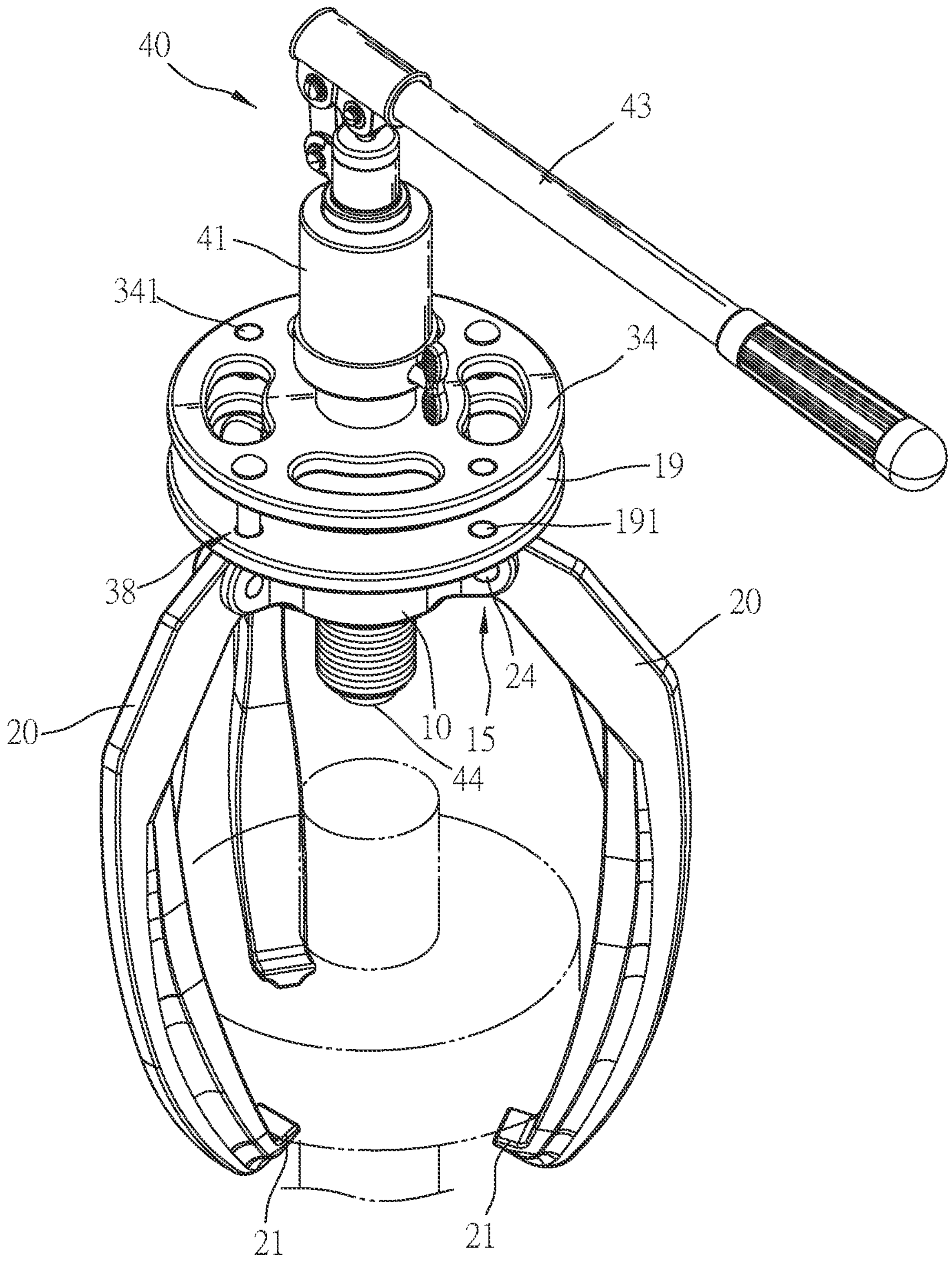
FIG. 10 is a perspective view of a puller according to the second embodiment of the present invention.
Figure 11:
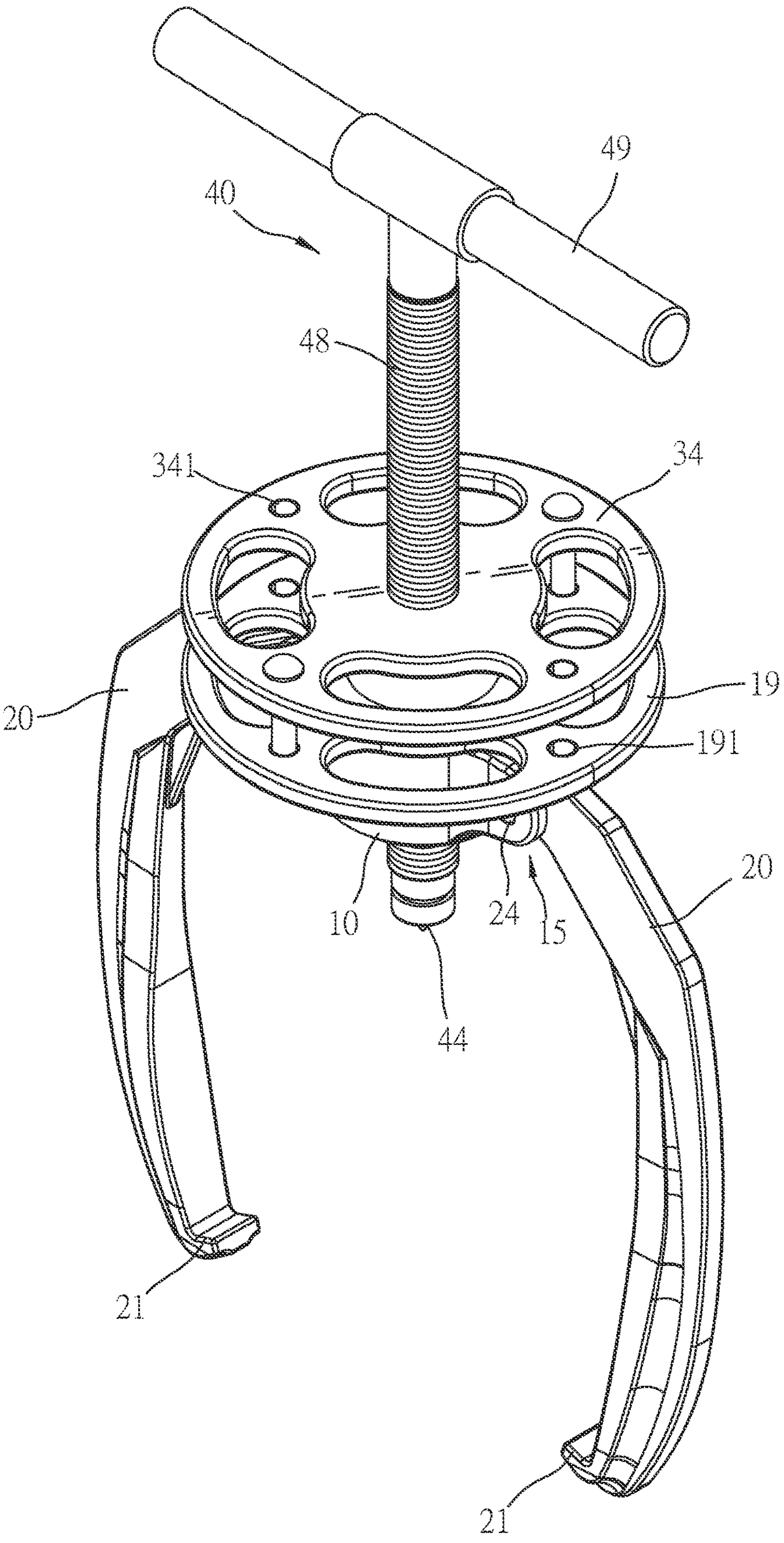
FIG. 11 is a perspective view of a puller according to the third embodiment of the present invention.
Figure 12:
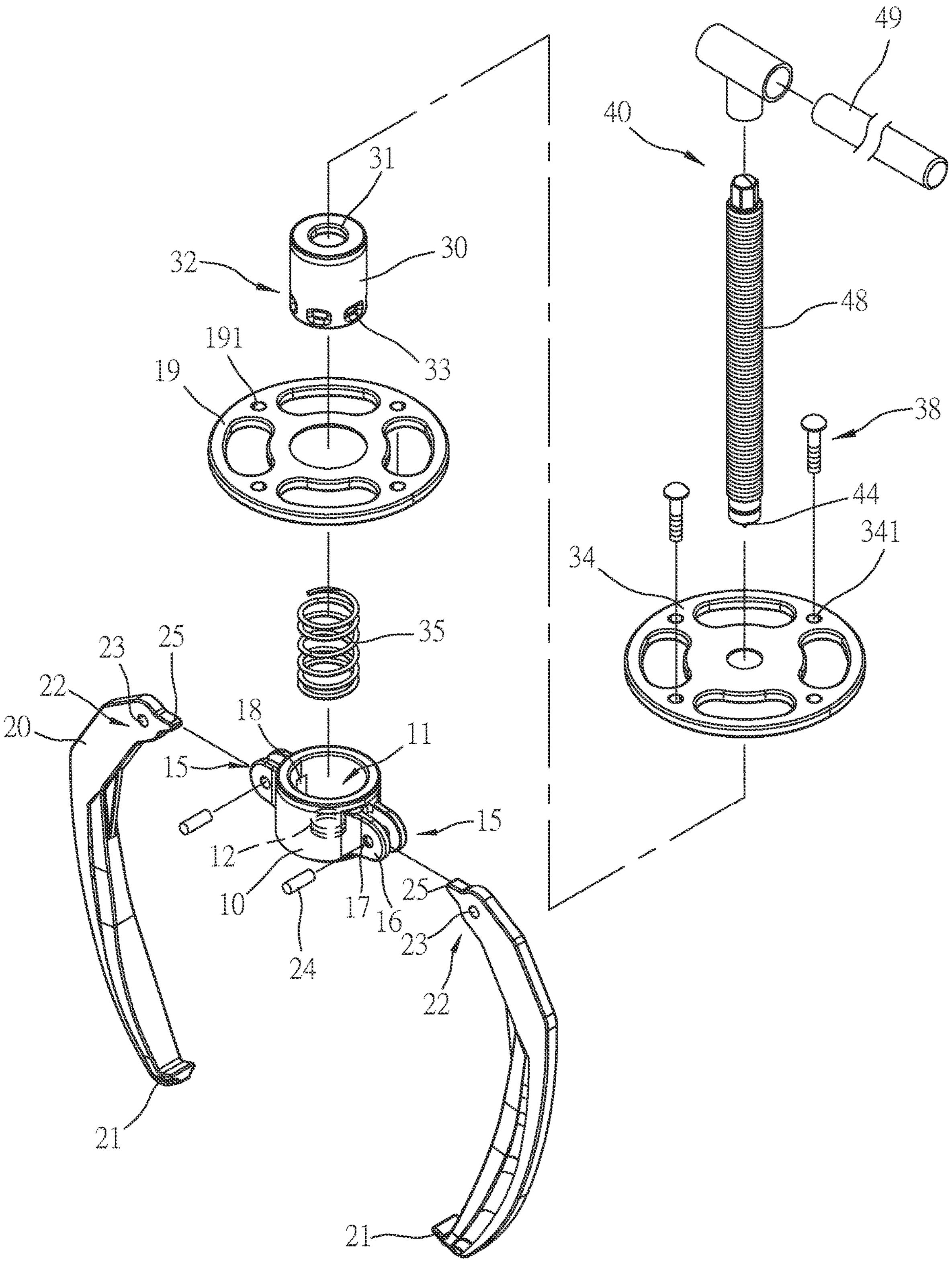
FIG. 12 is an exploded view of the puller shown in FIG. 11.
Figure 13:
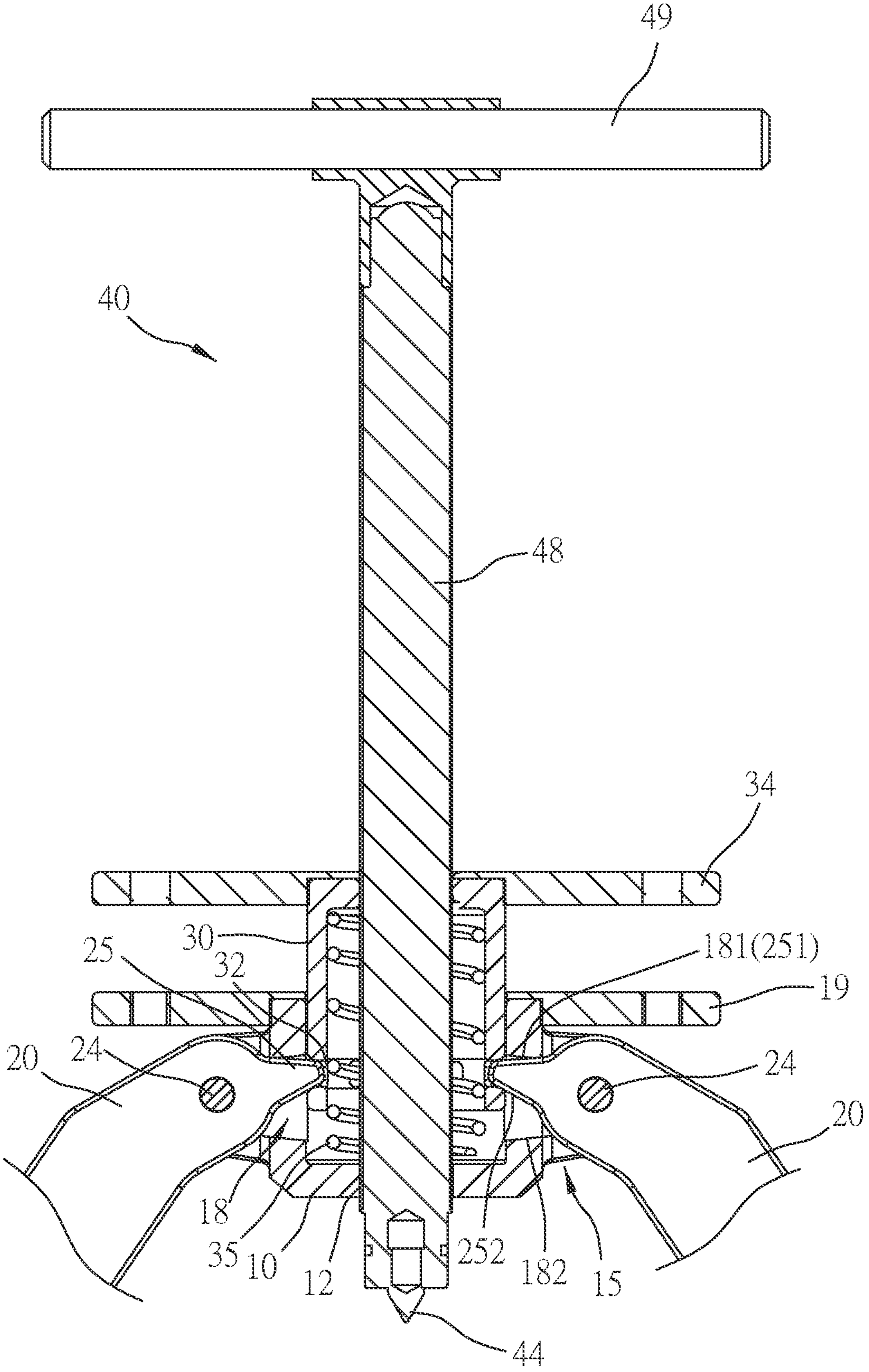
FIG. 13 is an enlarged, partial and cross-sectional view of the puller shown in FIG. 11.
Figure 14:
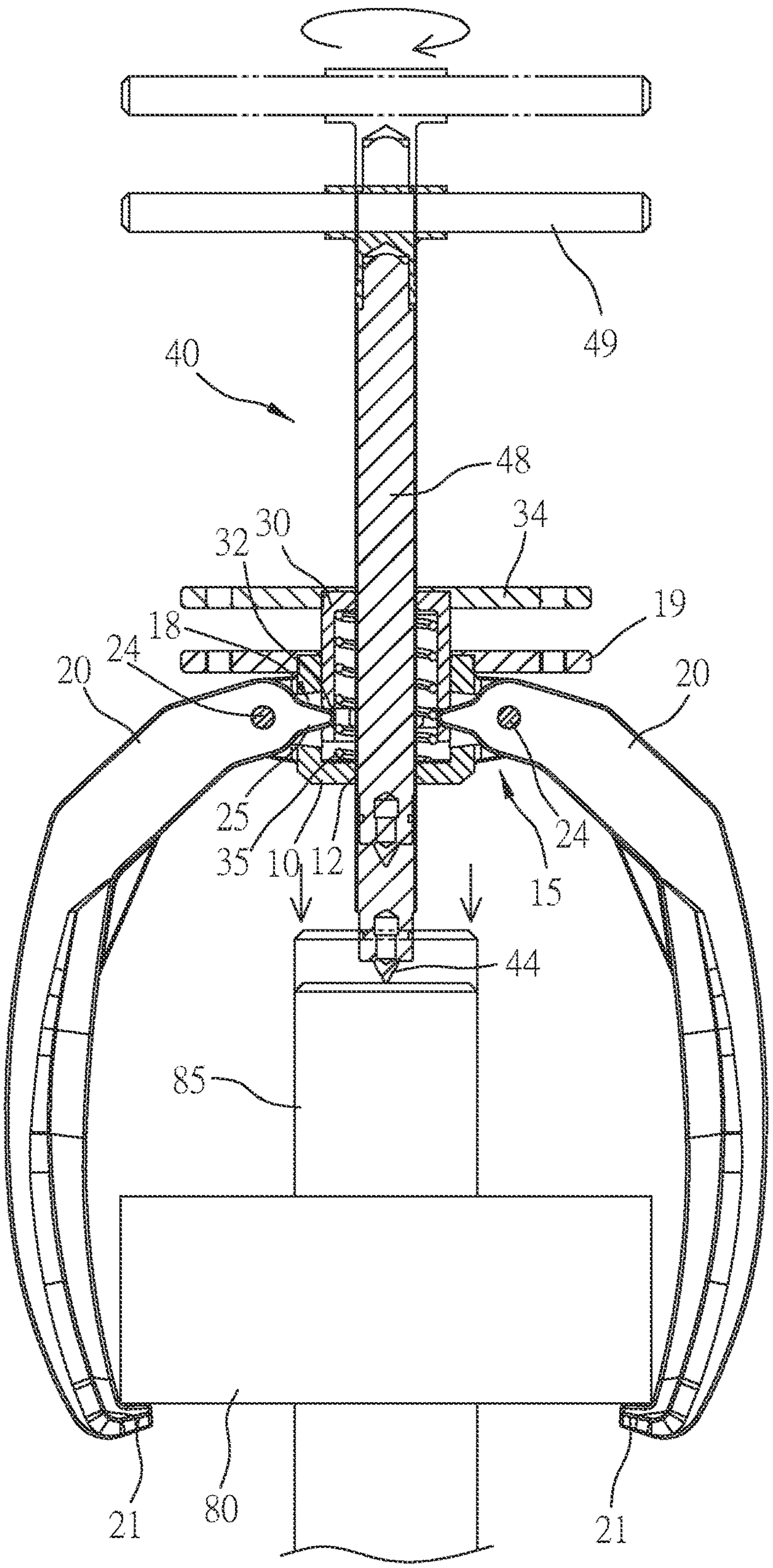
FIG. 14 is a cross-sectional view of the puller shown in FIG. 11 used to detach an annular element from an axle.

Referring to FIG. 10, shown is a puller according to a second embodiment of the present invention. The second embodiment is identical to the first embodiment except for including three claws 20 connected to three pivotal connectors 15 of the claws 20.

Referring to FIGS. 11 through 14, shown is a puller according to a third embodiment of the present invention. The third embodiment is identical to the first embodiment except for two things. Firstly, the abutting element 40 includes a threaded rod 48 inserted in the screw hole 12 and a lever 49 connected to the lever 49. Secondly, the end element 440 is made in one piece with the threaded rod 48, i.e., the tip 44 is formed at an end of the threaded rod 48. The lever 49 is operable to rotate and hence translate the threaded rod 48 relative to the collar 10.

As described above, the synchronizer 30, which is movable relative to the collar 10, is used to synchronize the pivoting of the claws 20, which are pivotally connected to the collar 10, toward or away from the annular element 80. Hence, the puller is simple in structure.

Furthermore, between the claws 20, there is only the abutting element 40 used to abut against the upper end of the axle 85. Hence, there is nothing to interfere with the pivoting of the claws 20 or replacement of any of the claws 20 with another claw.

Moreover, the protuberance 25 of the claws 20 are inserted in the slots 18 of the collar 10 and some of the bores 33 of the synchronizer 30, thereby keeping the lower section of the synchronizer 30 in the collar 10 in operation. During the replacement of any of the claws 20 with another claw, the screws 38 keep the discs 19 and 34 to each other to keep the lower section of the synchronizer 30 in the collar 10, without having to use any other element. This also simplifies the structure of the puller. The easy replacement of any of the claws 20 with a claw 20A of another size saves the user from purchasing and keeping pullers of various sizes which would otherwise be expensive and inconvenient.

In addition, the diverging gap between the limits 181 and 182 of each of the slots 18 allows a large range of the pivoting of a corresponding one of the claws 20. However, the limits 181 and 182 of the slots 18 keep the pivoting of the claws 20 to a reasonably large range.

The present invention has been described via the illustration of the embodiments. Those skilled in the art can derive variations from the embodiments without departing from the scope of the present invention. Therefore, the embodiments shall not limit the scope of the present invention defined in the claims.

The invention claimed is:

1. A puller comprising:

a collar comprising slots and pivotal connectors located corresponding to the slots;

claws pivotally connected to the pivotal connectors, wherein each of the claws comprises a protuberance movable in and along a corresponding one of the slots;

a synchronizer comprising a receiving portion for receiving the protuberances, wherein the synchronizer is movable in the collar between an opening position and a closing position, wherein the synchronizer opens the claws by the protuberances in the opening position, wherein the synchronizer closes the claws by the protuberances in the closing position;

a first disc connected to the collar;

a second disc connected to the synchronizer, wherein the first and second discs are movable toward each other to move the collar toward the synchronizer; and an abutting element extensible from the collar.

2. The puller according to claim 1, wherein each of the pivotal connectors comprises two lugs, wherein each of the slots is located between the lugs of a corresponding one of the pivotal connectors, wherein each of the claws is located between and pivotally connected to the lugs of a corresponding one of the pivotal connectors.

3. The puller according to claim 2, wherein each of the lugs comprises an aperture, wherein each of the claws comprises an aperture for receiving a pivot extending throughout the aperture of a corresponding one of the lugs.

4. The puller according to claim 1, wherein each of the slots comprises a closing limit for limiting closing of a corresponding one of the claws and an opening limit for limiting opening of a corresponding one of the claws.

5. The puller according to claim 4, wherein the closing limit extends away from the opening limit of each of the slots as they extend to an internal face of the collar from an external of the collar to allow the claws to pivot in a large range.

6. The puller according to claim 1, further comprising at least one screw for interconnecting the first and second discs.

7. The puller according to claim 6, wherein the first disc comprises at least one aperture, wherein the second disc comprises at least one screw hole, wherein the screw is inserted in the screw hole of the second disc via the aperture of the first disc to keep the first and second discs together and allow the first and second discs to move relative to each other.

8. The puller according to claim 1, wherein the receiving portion of the synchronizer comprises bores for receiving the protuberances of the claw.

9. The puller according to claim 1, further comprising a spring located between the synchronizer and the collar so that the spring tends to push the synchronizer away from the collar, thereby closing the claws.

10. The puller according to claim 9, wherein the spring is a compression spring.

11. The puller according to claim 1, wherein the abutting element comprises a tip for abutment against an axle from which an annular element is to be detached.

12. The puller according to claim 1, further comprising an extensive element coaxially connected to the abutting element.

13. The puller according to claim 1, wherein the abutting element is a hydraulic device comprising a cylinder inserted in and connected to the collar and a piston rod extensible from the cylinder.

14. The puller according to claim 1, wherein the abutting element is a threaded rod, wherein the collar comprises a screw hole for receiving the threaded rod so that the threaded rod is rotatable and hence extensible from the collar.

* * * * *